United States Patent Office 3,133,906
Patented May 19, 1964

3,133,906
PROCESS FOR THE PRODUCTION OF CRYSTAL-LINE HIGH POLYMERS OF VINYL ALKYL ETHERS
Giulio Natta, Gino Dall 'Asta, and Nino Oddo, Milan, Italy, assignors to Montecatini Societa Generale per l'Industria Mineraria e Chimica, a corporation of Italy
No Drawing. Filed June 12, 1959, Ser. No. 819,805
Claims priority, application Italy June 19, 1958
12 Claims. (Cl. 260—91.1)

This invention relates to a method for polymerizing vinyl ethers to crystalline high polymers, and to the polymers produced by said method.

The vinyl ethers, $CH_2=CHOR$ where R is an alkyl radical having from 1 to 8 carbon atoms, are preferably polymerized with catalysts which function with a cationic mechanism. Catalysts of other types, that is catalysts which function with a radical or anionic mechanism, or through a metallorganic polyaddition, are less suitable for inducing the polymerization of the vinyl ethers.

The catalysts generally used in the known processes for the cationic polymerization of vinyl ethers are acidic catalysts, particularly the so-called "Friedel-Crafts" catalysts which are acidic metal halides the most commonly used of which are $AlCl_3$, $ZnCl_2$, $TiCl_4$ and $SnCl_4$.

The polymerizates obtained from vinyl ethers using those catalysts can be in the form of syrupy liquors, of sticky resins, or (when the molecular weight is sufficiently high) of rubbery substances, depending on the particular acidic catalyst used and polymerization conditions employed.

The polymerizates obtained by the catalysts mentioned all possess a disorderly or irregular molecular structure. That is to say, those polymerizates resulting from the known polymerization methods using catalysts as aforesaid lack the regular configuration of the tertiary carbon atoms which is indispensable to give the polymers a crystallizable molecular structure such as the stereoregular structures which Natta has called the "isotactic" structure and the "syndiotactic" structure.

Because of the structural disorder or irregularity of the chains of most of the known vinyl ether polymers, it follows that those polymers cannot crystallize and have, therefore, the typical characteristics of many amorphous polymers such as tackiness, low softening point, and solubility in common solvents.

The pending applications of G. Natta et al. Serial Nos. 514,097, 514,098 and 514,099, refer to the work of C. E. Schildknecht et al. (Ind. Eng. Chem. 40, 1948, 2104; 41, 1949, 1998, 2891) in which those authors described the only instance in the literature of polymeric vinyl ethers which were partially crystalline on X-ray examination, slightly soluble in certain solvents, and less sticky than the polymers generally obtained from vinyl ethers.

Polymeric vinyl ethers described as crystalline by Schildknecht et al. include polymeric methyl-vinyl-, iso-butyl-vinyl- and n-butyl-vinyl ether. The authors also report having obtained crystalline polymeric isopropyl-vinyl ether, without, however, describing it.

The polymeric vinyl ethers prepared according to Schildknecht et al., however, show crystallinity at the X-rays only when examined in the state of stretch-oriented fibers. In the unstretched state they are amorphous or only weakly crystalline. Their mechanical properties are rather poor, on account of the low crystallinity; no definite yield point can be observed in stress-elongation diagrams taken on them.

Schildknecht et al. attributed the partial crystallinity of the poly(vinyl ethers) reported by them to the presence, in the polymeric chain, of sections containing the tertiary carbon atoms having a regular alternation of the two opposite possible steric configurations.

Natta et al. have shown that, in fact, the partial crystallinity of the polymeric vinyl ethers produced by Schildknecht et al. is due to the presence therein of chain sections containing tertiary carbon atoms having an identical steric configuration and, therefore, the molecular structure which Natta has called the "isotactic" structure.

The catalyst used by Schildknecht et al. to obtain the polymeric vinyl ethers reported by them was the addition compound, boron fluoride etherate, which is a halide of boron in which the three primary valencies of the metal are bound to halogen atoms through $\sigma$ bonds, while a molecule of ether is linked by means of supplementary and relatively weak $\pi$ bonds, thus forming an addition product which, in comparison to pure $BF_3$ has the advantages of being liquid, relatively stable to air, and easy to handle.

Heretofore, it has been assumed that the production of crystalline poly(vinyl ethers) having good mechanical properties and practical value depended on the use of the boron fluoride etherate as catalyst, and on a particular polymerization procedure comprising carrying out the polymerization at a temperature of $-80°$ C., in a special solvent (liquid propane) containing all of the monomer in solution and to which small quantities of the boron fluoride etherate would be added dropwise. The small quantity of catalyst used, and the fact that it is insoluble in propane and acts in a heterogeneous phase would assure the slow polymerization required for obtaining polymers showing the above-mentioned regular linkage of the monomeric units.

One object of this invention is to provide a new and improved process for the catalytic polymerization of the vinyl ethers.

Another object is to produce polymers of the vinyl ethers which have high molecular weight, contain chains having, for a considerable portion thereof, the isotactic structure as a result of which the polymers are more highly crystalline than those of the prior art and are capable of being formed into useful fibers, foils and films.

Surprisingly, we find that we can obtain the more highly crystalline polymeric vinyl ethers using acidic catalysts derived from a wide range of metals and which are modified "Friedel-Crafts" catalysts which, so far as we are aware, have never been applied to the field of cationic polymerizations or even considered for use in such reactions.

The catalysts which we use in the present process are obtained by replacing one or more of the halogens attached to the central metal atom in a typical Friedel-Crafts catalyst with organic groups, and correspond to the general formula $X_nMeR_m$ where Me is an atom of a multivalent metal (trivalent aluminium, tetravalent titanium, tetravalent tin, tetra- and pentavalent vanadium, trivalent chromium and trivalent iron), X is halogen, R is an organic group which may be an alkyl, aryl, or alkoxy radical containing from 1 to 12 carbon atoms, or the monocarboxylic acid radical; $n$ and $m$ are each equal to at least 1; and the sum of $n$ and $m$ is equal to the valency of the metal Me.

Thus, as is apparent from the foregoing formula, in our catalysts the primary valencies of the central metal atom are only partially satisfied by halogen atoms, while the remaining valencies are linked, also through $\sigma$ bonds to organic groups.

Depending on the particular catalyst we select for use, the polymerization of the vinyl ethers according to this invention can be carried out either in a heterogeneous phase or in a homogeneous phase, and in a wide variety of inert organic solvents. It is also possible, using our catalysts, to obtain polymeric vinyl ethers of widely varying molecular weight.

Our catalysts have a weak cationic activity which assures a slow and orderly polymerization of the vinyl ethers regardless of whether the polymerization takes place in a homogeneous phase or in a heterogeneous phase.

Typical examples of the acidic catalysts used in practicing our invention and embraced by the formula given above include

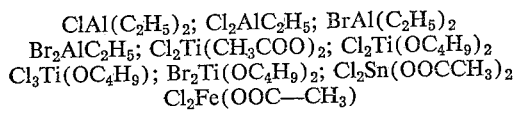

Solvents which may be used as the inert polymerization diluent in carrying out the present polymerization method are the aromatic and aliphatic hydrocarbons. Preferably the inert solvent used is an aromatic hydrocarbon which is liquid at the low polymerization temperatures employed.

With regard to the temperature of polymerization, we find that all temperatures between −30° C. and −100° C., preferably between −50° C. and −80° C. can be used. It is no longer necessary, in the polymerization of the vinyl ethers to crystalline polymers, to use the very restricted temperature of −80° C. which was required by Schildknecht et al. for their process using boron trifluoride etherate as the polymerization catalyst.

Although the catalysts of our invention have weak cationic activity, they give high yields of polymers having a high content of isotactic structure and which are, therefore, highly crystalline.

The polymerizates we obtain are generally at least in part soluble in hot acetone; thus in the case of polymeric isobutyl-vinyl- and neopentyl-vinyl ether a small (about 10%) amorphous fraction can be extracted from the polymerizate with hot acetone and can thus be separated from the crystalline portion which is insoluble in that solvent.

In certain cases, e.g. with polymeric isopropyl-vinyl ether, the entire polymerizate, including the highly crystalline portion, is extractable with boiling acetone.

The crystalline polymers are generally compact and non-sticky and can be extruded easily, to obtain stretchable filaments and films having good mechanical properties.

Our solid polymeric vinyl-isobutyl ether shows high crystallinity at the X-rays even when non-oriented powder samples are examined. In X-ray spectra registered with the aid of a Geiger counter (CuKα) diffractions are present corresponding to angles $2\theta$ equal to 9°08'; 10°50'; 13°80'; 17°36'; 18°40'; 21°15'; the crystalline melting point is around 115–120° C.

Similarly, our solid polymeric neopentyl-vinyl ether is a highly crystalline free-flowing powder which shows in X-ray spectra of non-oriented samples diffractions corresponding to angles $2\theta$ equal to 8°06'; 9°09'; 17°01'; 19°07'; the crystalline melting point is above 150° C.

Fiber spectra of our polymeric isopropyl-vinyl ether show diffractions corresponding to angles $2\theta$ equal to 10°03'; 14°07'; 23°03'; powder spectra of this polymer do not show evidence of crystallinity.

In the stress-elongation diagram taken on specimens of our polymeric vinyl-isobutyl ether a yield point at 50–60 kg./cm.² is clearly apparent.

The following examples are given to illustrate the invention, it being understood that these examples are not intended to be limiting.

*Example 1*

In a 250 cc. flask, provided with a stirrer, a reflux condenser and a dropping funnel, 50 cc. of toluene and 0.28 cc. (2.5 millimols) of dichloro-monoethyl-aluminum are introduced, in an anhydrous environment, in nitrogen.

After having cooled the mixture down to −80° C., and with continuous stirring, 33 cc. (0.25 mol) of anhydrous isobutyl-vinyl-ether, previously rectified on metallic sodium, are added drop by drop during a 2 to 4 hour period. When the addition of the monomer is complete, the reaction mixture is kept for 2 to 4 hours at −80° C., stirring being continued. Finally, about 100 cc. of methanol, containing 1 cc. of 38% hydrochloric acid and about 0.1 gr. of N-(p-hydroxy-phenyl)-morpholine as stablizer are added. The mixture obtained is then introduced into about 500 cc. of methanol, in order to complete the precipitation of the polymer, and is kept for one night under fresh methanol. It is then vacuum-dried at about 50° C. and subsequently dissolved in 100 cc. of benzene.

After having been filtered, the solution is reprecipitated by pouring it slowly into methanol, and is then dried under the pressure of 1 torr at 50° C. 19 g. (corresponding to a 75% conversion) are obtained of a solid, colorless, non sticky, highly elastic polymer. From the hot polymer, stretchable filaments, highly crystalline on X-ray examination, can be obtained. The softening temperature is about 85° to 90° C.

The intrinsic viscosity measured in toluene at 30° C. is about 2.2.

The elasticity, together with the crystallinity, give the polymer the characteristics of a good elastomer.

*Example 2*

Operating as in Example 1, but having the reaction take place at −50° C., instead of at −80° C., 13.5 g. (corresponding to a 55% conversion) of polymer having characteristics analogous to those described in Example 1, are obtained.

*Example 3*

Operating as in Example 1, but using heptane as solvent, instead of toluene, there are obtained 20 g. (corresponding to an 85% conversion) of a solid, elastic polymer, crystalline on X-ray examination, and quite similar to the polymer described in Example 1.

*Example 4*

Operating as in Example 1, but using as a catalyst 0.3 cc. (2.5 millimols) of monochloro-diethyl aluminum, instead of dichloro-monoethyl-aluminum, we obtained 16 g. (corresponding to a 65% conversion) of a solid polymer having characteristics similar to those described in Example 1.

*Example 5*

Operating as in Example 1, but using as a catalyst 0.85 g. (3.5 millimols) of titanium dichloro-diacetate, instead of dichloro-monoethyl-aluminum, 14 g. (corresponding to a 55% conversion) are obtained of a solid, colorless, non-sticky polymer (remarkably more granular than that of Example 1) which can be easily spun into filaments. The threads can be stretched and are highly crystalline on X-ray examination. The softening temperature is about 75° to 80° C. The intrinsic viscosity, measured in benzene at room temperature, is about 0.5. The high crystallinity (higher than that of the product obtained as per Example 1), together with the granular condition and limited elasticity, give the polymer the characteristics of a good crystalline plastomer.

*Example 6*

Operating as in Example 5, but having the reaction take place at −50° C., instead of at −80° C., 11 g. (corresponding to a 45% conversion) of polymer with characteristics analogous to those described in Example 5, are obtained.

*Example 7*

Operating as in Example 5, but using as a catalyst 0.60 g. (2.5 millimols) of titanium dichloro-di-n-propylate, instead of titanium dichloro-diacetate, 5 g. (corresponding to a 20% conversion) are obtained of a colorless, non-sticky, polymer which is crystalline on X-ray examination, relatively granular and non-elastic.

Example 8

Operating as described in Example 1 but using 0.04 cc. (0.4 millimol) instead of 0.28 cc. (2.5 millimols) dichloromonoethyl aluminum and introducing the monomer in the course of 8 hours (instead of 4 hours), 6.5 g. (corresponding to a conversion of 26%) crystalline polyvinylisobutylether, having characteristics analogous to those of the polymer described in the preceding example, are obtained.

Example 9

In a 250-cc. flask, provided with stirrer, reflux condenser and dropping funnel, 50 cc. anhydrous toluene and 0.30 cc. (2.5 millimols) monochloro-diethyl aluminum are placed under anhydrous nitrogen. After cooling to −80° C., 25 cc. (0.21 mol) anhydrous vinylisopropylether, previously rectified on metallic sodium and treated with 0.1 cc. triethyl aluminum in order to eliminate the last traces of alcohols, are introduced dropwise over a period of 4 hours and while stirring. When the monomer addition is completed, the operation is continued as described in Example 1.

10.8 (corresponding to a conversion of 58%) of a solid, colorless, non-tacky and highly elastic polymer are obtained from which stretchable filaments can be hot-extruded which are crystalline by X-rays. The intrinsic viscosity in toluene at 30° C. is about 3.3. The polymer, also due to its high intrinsic viscosity, can be used as an elastomer.

Example 10

Operating as described in Example 9 but using as a catalyst 0.78 g. (3.3 millimols) titanium dichloro-dipropylate instead of monochloro-diethyl aluminum, 17 g. (corresponding to a conversion of 92%) of a colorless, non-tacky polyvinylisopropylether, presenting a very high tensile strength, are obtained. The filaments obtained by extrusion of this polymer are crystalline by X-rays.

Example 11

Operating as described in Example 9, but using as a catalyst 0.63 g. (2.7 millimols) titanium-dichloro diacetate in the presence of anhydrous ethyl ether instead of anhydrous toluene as a solvent, 1.9 g. (corresponding to a conversion of 10%) of a polyvinylisopropylether which is colorless, non-tacky, scarcely elastic and rather granular are obtained. The polymer is crystalline by X-rays even in the unstretched state. It has an intrinsic viscosity (in toluene at 30° C.) of about 1.1.

Example 12

In an apparatus similar to that described in Example 1, 50 cc. anhydrous toluene and 0.28 cc. (2.5 millimols) dichloro-monoethyl aluminum are placed. As in Example 1, 24 cc. (0.25 mol) vinylethyl ether, previously rectified on metallic sodium are introduced in the course of 2 hours. After the monomer addition is completed, the reaction mixture is kept at −80° C. for a further 4 hours, while stirring.

About 100 cc. methanol containing 1 cc. 38% hydrochloric acid and about 0.1 g. N-(p-hydroxyphenyl) morpholine as a stabilizer, are then introduced in to the solution, while stirring. All solvents are then removed by evaporation under reduced pressure, finally heating to 50° C. The residue consists of 16 g. (corresponding to a conversion of 88%) of a yellow crude polymer (slightly tacky and rather consistent). The crude polymer is dissolved in 200 cc. acetone, the resulting solution is filtered and dried under vacuum. The polyvinyl ethyl ether thus obtained is yellowish, non-tacky, consistent and considerably elastic.

Example 13

250 g. anhydrous propylene and 0.3 cc. (2.5 millimols) diethyl aluminum monochloride are introduced and liquefied in an apparatus similar to that described in Example 1 but having a capacity of 600 cc., cooled to −78° C.

Proceeding as described in Example 1, 33 cc. (0.25 mol) anhydrous vinyl isobutyl ether are slowly added within 6 hours. After addition of the monomer the reaction mixture is kept at −78° C. for further 15 hours.

Then, proceeding as described in Example 1, 15 g. crystalline polyvinyl isobutyl ether having a melting point of about 115° (corresponding to a conversion of 60%) are obtained.

Example 14

Proceeding as described in Example 13 but using 0.28 cc. (2.5 millimols) monoethyl aluminum dichloride instead of diethyl aluminum monochloride, 2 g. polyvinyl isobutyl ether having a yield point (determined on hot-moulded specimens) of about 60 kg./cm.$_2$ are obtained.

Example 15

Proceeding as described in Example 13 but using 11 g. (0.1 mol) vinyl neopentyl ether instead of vinyl isobutyl ether as a monomer, 5 g. polyvinyl neopentyl ether (corresponding to a conversion of 45%) are obtained. This polymer is solid, non-tacky, very hard and scarcely elastic; by hot extrusion it yields filaments which can be hot stretched and appear highly crystalline by X-rays examination. The melting point is higher than 150° C.

Example 16

Proceeding as described in Example 15 but using 250 cc. toluene instead of liquid propylene as a solvent, 10.5 g. polyvinyl neopentyl ether (corresponding to a conversion of 95%) having characteristics similar to those described in Example 15, are obtained.

Various changes and modifications may be made in details in practicing our invention, without departing from the spirit thereof and therefore we intend to include in the scope of the appended claims all such variations as may be apparent to those skilled in the art from the description and specific examples given herein.

We claim:

1. A process for the production of crystalline, high molecular weight polymers of vinyl ethers having the general formula $CH_2=CHOR$ in which R is an alkyl radical containing from 1 to 8 carbon atoms, which process comprises contacting the monomeric vinyl ether to be polymerized, in an inert hydrocarbon solvent and at a temperature of from −30° C. to −100° C., with a catalyst consisting essentially of a substance having the formula $X_nMeR_m$ where Me is an atom of a multivalent metal selected from the group consisting of trivalent aluminum, tetravalent titanium, tetravalent tin, tetravalent vanadium, pentavalent vanadium, trivalent chromium and trivalent iron; X is halogen, R is an organic radical selected from the group consisting of alkyl aryl, alkoxy and monocarboxylic acid radicals, and $n$ and $m$ are each at least equal to 1, the sum of $n+m$ being equal to the valency of the metal Me.

2. The process according to claim 1, characterized in that the catalyst is an alkyl aluminum halide.

3. The process according to claim 1, characterized in that the catalyst is a titanium dihalo-diacylate.

4. The process according to claim 1, characterized in that the catalyst is a titanium dihalo-dialcoholate.

5. The process according to claim 1, characterized in that the catalyst is dichloro-monoethyl-aluminum.

6. The process according to claim 1, characterized in that the catalyst is monochloro-diethyl aluminum.

7. The process according to claim 1, characterized in that the catalyst is titanium-dichloro-diacetate.

8. The process according to claim 1, characterized in that the catalyst is titanium dichloro-di-n-propylate.

9. The process according to claim 1, characterized in that the vinyl ether contacted with the catalyst is vinylisobutyl ether.

10. The process according to claim 1, characterized in that the vinyl ether contacted with the catalyst is vinylisopropyl ether.

11. The process according to claim 1, characterized in that the vinyl ether contacted with the catalyst is vinylethyl ether.

12. The process according to claim 1, characterized in that the vinyl ether contacted with the catalyst is vinyl neopentyl ether.

References Cited in the file of this patent

UNITED STATES PATENTS

| | | |
|---|---|---|
| 2,846,427 | Findlay | Aug. 5, 1958 |
| 2,984,656 | Lal | May 16, 1961 |

FOREIGN PATENTS

| | | |
|---|---|---|
| 571,741 | Italy | Apr. 15, 1958 |

OTHER REFERENCES

Gaylord et al.: "Linear and Stereoregular Addition Polymers," page 122, Interscience Publishers, Inc., New York (1959).

Miller et al.: "Journal of Polymer Science," volume 44, pages 391–5 (1960).

Natta et al.: "Die Makro. Chemie," volumes 16–19 (1956), pages 455–462.

Natta et al.: "J.A.C.S.," volume 77 (1955), pages 1708–1710.